(12) United States Patent
Erznoznik (10) Patent No.: US 11,358,664 B2
(45) Date of Patent: Jun. 14, 2022

(54) SYSTEM FOR ASSISTING THE DRIVING OF A VEHICLE COMPRISING AN OPEN HYDRAULIC CIRCUIT

(71) Applicant: POCLAIN HYDRAULICS INDUSTRIE, Verberie (FR)

(72) Inventor: Matej Erznoznik, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 435 days.

(21) Appl. No.: 16/344,756

(22) PCT Filed: Oct. 24, 2017

(86) PCT No.: PCT/EP2017/077178
§ 371 (c)(1),
(2) Date: Apr. 24, 2019

(87) PCT Pub. No.: WO2018/077883
PCT Pub. Date: May 3, 2018

(65) Prior Publication Data
US 2020/0047832 A1 Feb. 13, 2020

(30) Foreign Application Priority Data

Oct. 25, 2016 (FR) ...................... 1660330

(51) Int. Cl.
*B62D 59/02* (2006.01)
*F04B 17/00* (2006.01)
(Continued)

(52) U.S. Cl.
CPC .............. *B62D 59/02* (2013.01); *F04B 17/00* (2013.01); *F15B 11/02* (2013.01); *F16H 61/4148* (2013.01); *F16H 61/478* (2013.01)

(58) Field of Classification Search
CPC ...... B62D 59/02; F03C 1/0425; F03C 1/0472; F03C 1/2407; F04B 1/0472; F04B 1/1071; F16H 61/4148; F16H 61/478
See application file for complete search history.

(56) References Cited

U.S. PATENT DOCUMENTS

| | | | | |
|---|---|---|---|---|
| 3,811,525 A | * | 5/1974 | Stuart | B60K 17/10 180/243 |
| 3,823,650 A | * | 7/1974 | Ring | B60K 7/0015 91/497 |

(Continued)

FOREIGN PATENT DOCUMENTS

| | | |
|---|---|---|
| CN | 102162514 A | 8/2011 |
| CN | 102933839 A | 2/2013 |

(Continued)

OTHER PUBLICATIONS

Preliminary Research Report received for French Application No. 1660330, dated Jun. 16, 2017, 2 pages (1 page of French Translation Cover Sheet and 1 page of original document).

(Continued)

*Primary Examiner* — Kenneth Bomberg
*Assistant Examiner* — Matthew Wiblin
(74) *Attorney, Agent, or Firm* — Womble Bond Dickinson (US) LLP (57) ABSTRACT

The present invention relates to a system for assisting the driving of a vehicle comprising at least one hydraulic machine forming a pump (19), at least one hydraulic machine forming an engine (130, 140) and an open hydraulic circuit (100) extending through a tank (13) and comprising a suction duct (11) extending from the tank (13) to an inlet of the pump (19), a supply duct (15) extending from the outlet of the pump (19) to the inlet of the engine (130, 140) and a return duct (122) extending from the outlet of the engines (130, 140) to the tank (13), characterised in that at (Continued)

least one of the engines (130, 140) is an engine that can disengage the clutch, and in that the system comprises an element forming a restriction (180) and creating a loss of charge over the return duct and a means (190, 192) adapted for connecting to the engine casing, the part of the return duct (122) located upstream of the element forming a restriction (180) and for applying to the engine casing, from the return duct (122), a pressure lower than the pressure of this return duct.

18 Claims, 9 Drawing Sheets

(51) Int. Cl.
*F15B 11/02* (2006.01)
*F16H 61/4148* (2010.01)
*F16H 61/478* (2010.01)

(56) References Cited

U.S. PATENT DOCUMENTS

| | | | | |
|---|---|---|---|---|
| 6,367,572 | B1* | 4/2002 | Maletschek | B60K 17/356 |
| | | | | 180/243 |
| 6,543,222 | B1* | 4/2003 | Case | B60T 1/065 |
| | | | | 188/264 F |
| 9,074,578 | B2* | 7/2015 | Souply | F03C 1/247 |
| 9,896,935 | B2* | 2/2018 | Prigent | F16H 61/439 |
| 10,267,149 | B2* | 4/2019 | Erlston | F03C 1/26 |
| 2011/0197574 | A1 | 8/2011 | Prigent et al. | |

FOREIGN PATENT DOCUMENTS

| | | | |
|---|---|---|---|
| CN | 105190122 A | 12/2015 | |
| EP | 0399932 A1 * | 11/1990 | ............ B62D 59/02 |
| EP | 0399932 A1 | 11/1990 | |
| EP | 0993982 A1 | 4/2000 | |
| EP | 2361798 A1 | 8/2011 | |
| FR | 2379394 A1 | 9/1978 | |
| FR | 2426812 A1 | 12/1979 | |
| FR | 2504987 A1 | 11/1982 | |
| FR | 2651836 A1 | 3/1991 | |
| FR | 2935128 A1 | 2/2010 | |
| FR | 3022860 A1 | 1/2016 | |
| WO | 2012/123056 A1 | 9/2012 | |
| WO | 2014/048842 A1 | 4/2014 | |
| WO | 2015/150570 A1 | 10/2015 | |

OTHER PUBLICATIONS

International Search Report and Written Opinion received for PCT Patent Application No. PCT/EP2017/077178, dated Jan. 31, 2018, 20 pages (9 Pages of English Translation and 11 Pages of Original Document).

International Preliminary Reporton Patentability received for PCT Patent Application No. PCT/EP2017/077178, dated May 9, 2019, 16 pages (8 Pages of English Translation and 8 Pages of Original Document).

Office Action received for Chinese Patent Application No. 201780079103.3, dated Sep. 15, 2021, 12 pages (8 pages of English Translation and 4 pages of Office Action).

* cited by examiner

SYSTEM FOR ASSISTING THE DRIVING OF A VEHICLE COMPRISING AN OPEN HYDRAULIC CIRCUIT

The present invention relates to the field of vehicle driving assistance circuits.

More particularly, the present invention applies to open type hydraulic circuits, that is to say, in which a circuit supplying hydraulic pump sucks oil into a tank and the oil return exiting the supply circuit is returned to the tank (contrary to those known as closed circuits in which a booster pump is usually required to ensure that a minimum pressure is maintained within the circuit).

The present invention particularly applies to driving trailers.

It has already been proposed many hydraulic systems for assisting the driving of vehicles, in particular trailers.

Examples of known systems can be found in documents FR 2379394, EP 0399932, EP 0993982, FR 2935128 and WO2012/123056.

A few systems that have already been proposed are, as a whole, satisfactory.

However, most of the known systems are quite complex and expensive.

A main objective of the present invention is to propose a system for assisting in the driving of vehicles based on an open circuit with two lines, respectively for the supply and return, using hydraulic engines and allowing an overrunning clutch function.

The aforementioned purpose has been attained according to the present invention, thanks to a driving assistance system comprising at least a hydraulic machine forming a pump, at least a hydraulic machine forming an engine and an open hydraulic circuit extending through a tank and comprising a suction duct extending from the tank to an inlet of the pump, a supply duct extending from the outlet of the pump to the inlet of an engine and a return duct extending from the outlet of the engine to the tank, characterised by the fact that at least one of the engines is a disengageable engine and by the fact that the system comprises a member forming a restriction and creating a head loss or loss of charge on the return duct and a means adapted for connecting to the engine casing, the part of the return duct located upstream of the member forming a restriction and applying to the engine casing, from the return duct, a pressure lower than the pressure of this return duct.

As will be understood from reading the following description, the invention does not require a booster pump. It proceeds by applying on the casing of the machines forming an engine, a reduced pressure lower than the pressure present on the return duct.

According to other advantageous features of the invention:

the adapted means for connecting the part of the return duct located upstream of the member forming a restriction and applying to the engine casing, from this return duct, a pressure lower than the pressure of this return duct, comprises an output tapping device on the return duct which includes a secondary limitation restriction and a leak valve.

the system further comprises a recirculation valve which connects the supply and return lines of the hydraulic machine forming an engine, to the engine casing, in a non supplied position of the engine.

The invention also relates to a method for managing a vehicle driving assistance circuit The invention also relates to vehicles equipped with the aforementioned system.

Other features, aims and advantages of the present invention will become apparent upon reading the following detailed description and considering the accompanying drawings given by way of non limiting examples and in which:

On FIGS. 2 to 8 the oil circulation direction has been schematically represented by arrows on the concerned ducts.

Figure 1:
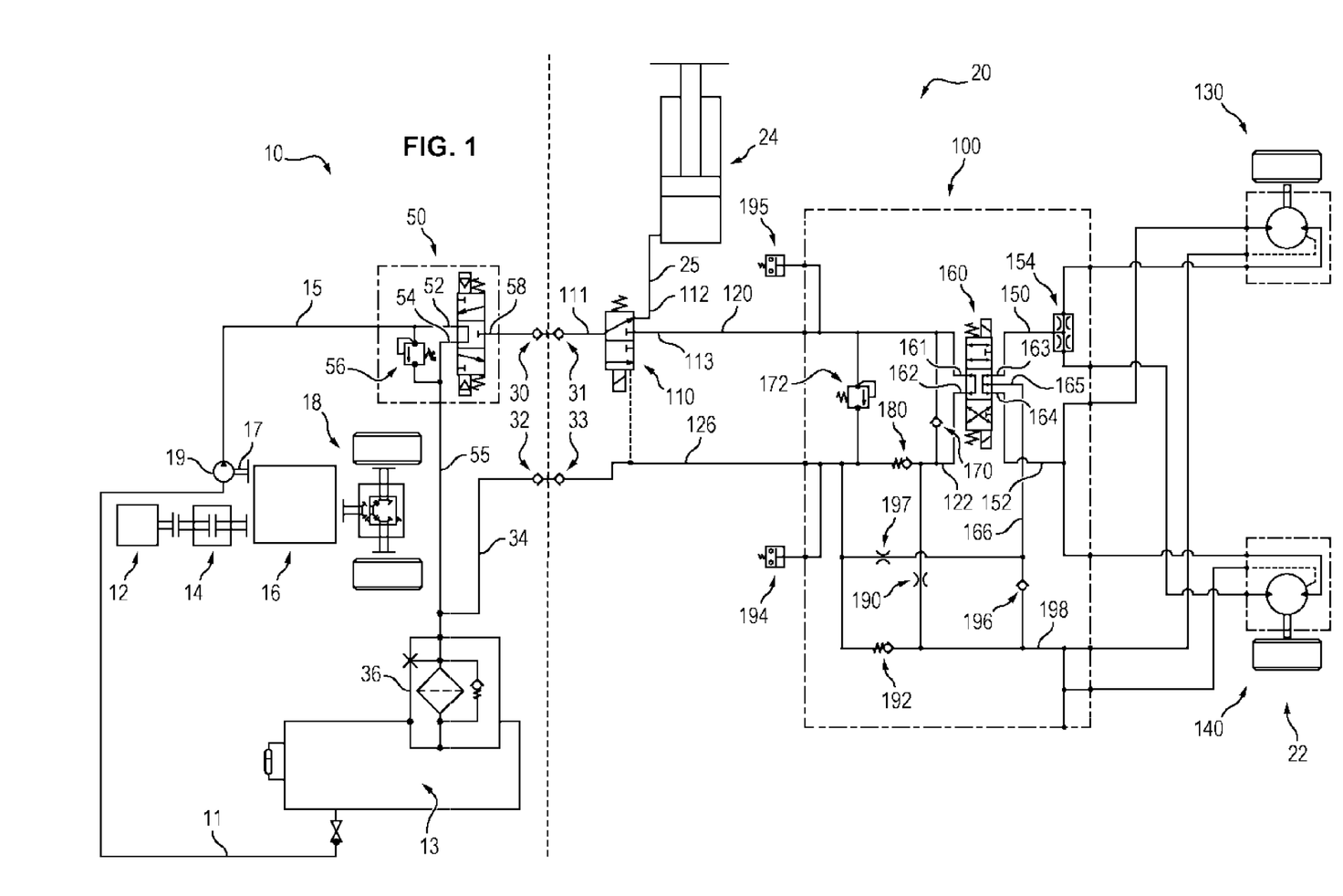
FIG. 1 represents a schematic view of the structure of the assembly of a hydraulic circuit in accordance with the present invention.

On FIG. 1 can be seen, a towing vehicle schematically referenced 10 and a trailer schematically referenced 20.

The towing vehicle 10 comprises a main engine 12, for example a thermal engine, a clutch 14 associated to the engine 12 and a gearbox 16 connected to the outlet of the clutch and interposed between the clutch 14 and a powered axle 18.

On FIG. 1, can also be seen a power take-off 17 driven directly or indirectly by the main engine 12 and placed for this purpose either on an outlet of the engine 12, or at the outlet of the gearbox 16 and a hydraulic machine forming a pump 19 driven by the power take-off 17.

The towing vehicle 10 also comprises a tank 13, a suction duct 11 that connects the tank 13 to the inlet of the pump 19, a supply duct 15 connected between the outlet of the pump 19 and a selection distributor 50, a supply connector 30 and a return duct 34 placed between a return connector 32 and the tank 13. The towing vehicle 10 can also comprise a filter 36 placed on the return duct 34.

The distributor 50 is a 3 way, 3 position distributor.

A first inlet 52 of the distributor 50 is connected to the supply duct 15.

A second inlet 54 of the distributor 50 is connected to the tank 13 by means of a duct 55.

A pressure limiter 56 can be placed between the inlets 52 and 54.

The outlet 58 is connected to the supply connector 30.

In a first position of the distributor 50, the two inlets 52 and 54 are interconnected. As can be seen on FIG. 2 in this position the output of the pump 19 is directly redirected to the tank 19 by the duct 55.

In a second position of the distributor 50, the first inlet 52 is connected to the outlet 58. As can be seen on FIGS. 3 and 5 to 8, in this position the output of the pump 19 can be used for supplying a jack or supplying the assistance.

In a third position of the distributor 50, the second inlet 54 is connected to the outlet 58. As can be seen on FIG. 4, in this position the aforementioned jack, referenced 24 can be drained to the tank 13.

In a manner known per se, the trailer 20 comprises a jack 24, for example a jack ensuring dumping, lifting and stabilising functions or any other additional function. The jack 24 is associated to a supply duct 25. The supply duct 25 is connected to a supply connector 31 intended to engage with the aforementioned connector 30 in a hydraulic connection.

Figure 3:
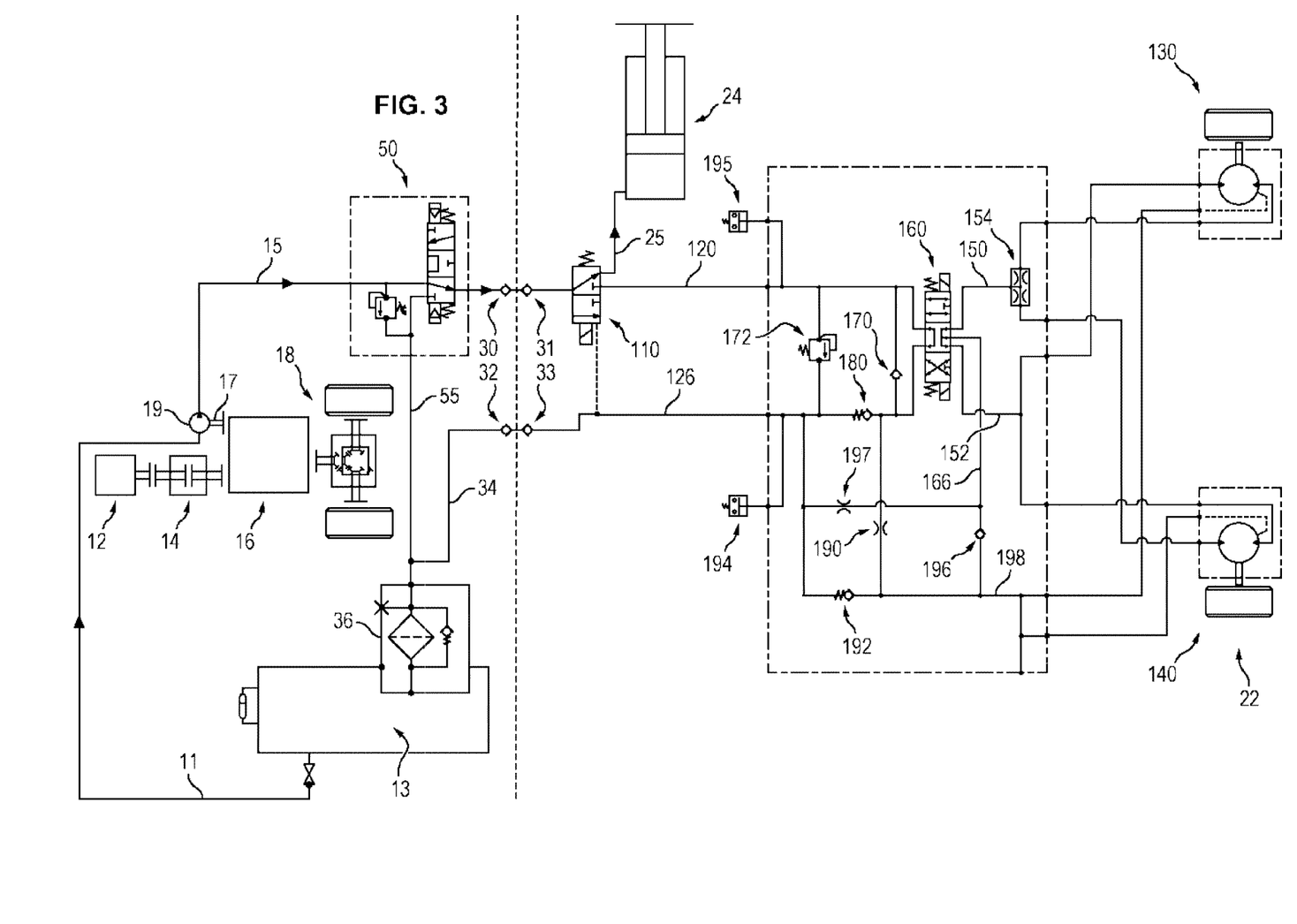
FIGS. 3 and 4 represent the same assembly respectively in supply position of a jack and discharge of the jack.

Thus, when the pump 19 is activated and the distributor 50 is in second position as illustrated on FIG. 3, the jack 24 is supplied by means of connections 15 and 25 and connectors 30, 31.

Figure 4:
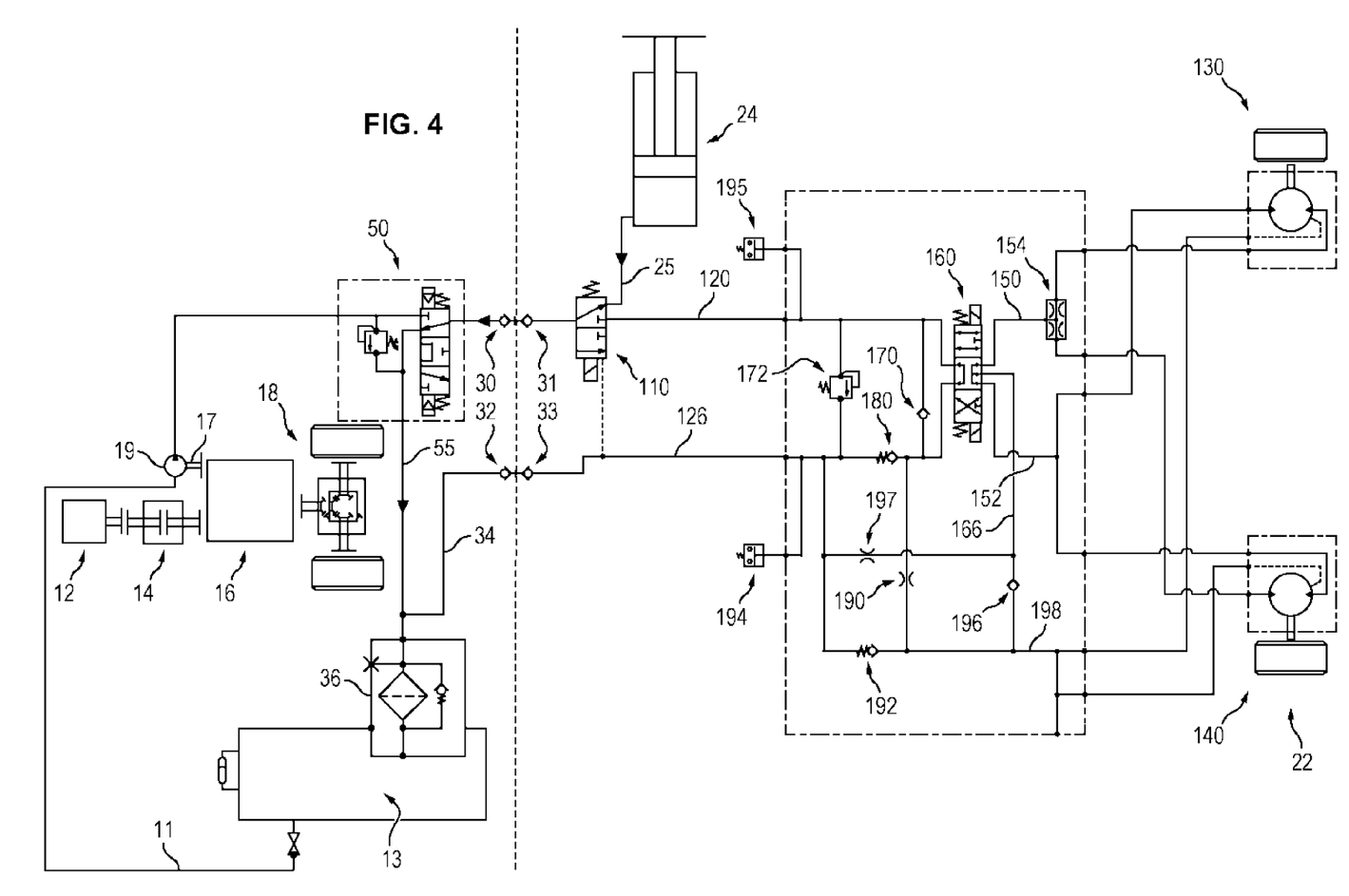

When the distributor 50 is commuted to third position, the jack 24 can be discharged via the line 25, the connectors 30, 31 and the line 55 to the tank 13 as illustrated on FIG. 4.

As part of the present invention, the aforementioned device allowing the supply of a jack 24 on the trailer 20 with an open hydraulic circuit, further comprises a driving assistance circuit 100 and a distributor 110 allowing selecting between the supply of the aforementioned jack 24 and the assistance circuit 100.

The distributor 110 is preferably a 3 way, two position type.

An inlet 111 of the distributor 110 is connected to the connector 31. Two outlets 112, 113 of the distributor 110 are respectively connected to the jack 24 supply duct 25 and to the assistance circuit 100 supply line 120.

In a first position of the distributor 110, the inlet 111 is connected to the outlet 112. The jack 24 is thus supplied, whereas the driving circuit for assisting the driving 100 is not supplied.

In the second position of the distributor 110, conversely, the inlet 111 is connected to the outlet 113. In this case, the jack 24 is not supplied and on the contrary, the driving assistance circuit 100 is supplied by the supply line and the connectors 30, 31.

The means that have just been described can be the object of alternative embodiments.

Thus for example alternatively, the selection distributor 50 can be omitted, the latter in particular allows, between its second position and third position, to choose between the supply or discharge of the jack 24, by associating if necessary an additional discharge duct for the jack 24, said additional discharge duct is connected by adapted means to the return duct 34 which ends in the tank 13.

The driving assistance circuit 100 comprises at least two engines 130, 140 respectively associated to the right and left wheel of the axle 22.

The hydraulic machines forming the engines 130, 140 are preferably engines with radial pistons of the type illustrated on accompanying FIG. 3.

Preferably, the hydraulic machines forming the engines 130, 140 are more particularly engines with retractable pistons.

The structure of such engines 130, 140, is well known by the skilled person and thereby will not be described in detail later.

Figure 9:
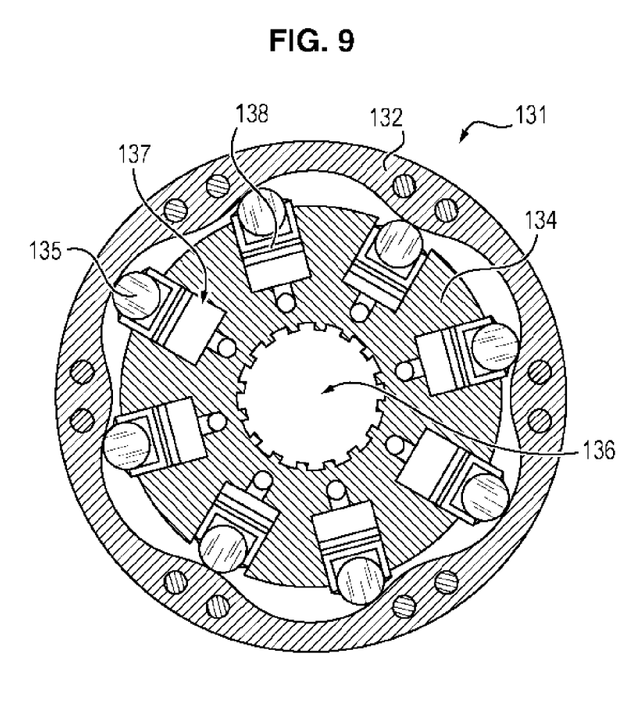
FIG. 9 represents a schematic cross-sectional view of an engine with radial pistons preferably used as part of the present invention.

Company POCLAIN HYDRAULICS manufactures and commercialises many engines with radial pistons of the type illustrated on the accompanying FIG. 9.

However, it is worth noting that, preferably, the hydraulic engines with radial pistons of the type illustrated on FIG. 9 comprise within a casing 131:

a multi-lobe cam 132 preferably formed on the inner surface of a casing member, a cylinder block 134 rotationally mounted in the casing 131, a shaft 136 rotatably connected to the cylinder block 134, pistons 138 guided radially sliding in respective cylinders 137 of the cylinder block and pressing against the cam lobes 132, preferably by means of rollers 135.

The engines with radial pistons of the type illustrated on FIG. 9 also comprise (not shown on FIG. 9) an adapted distributor for successively applying in a controlled manner a pressurised fluid in the cylinders 137 and as a result on the pistons 138, such that the successive pressing of the pistons 138, by means of the rollers 135, onto the cam lobes 132 drives the relative rotation of the cylinder block 134 and the members connected to it with respect to the casing 131.

To be disengageable, the pistons 138 and associated rollers 135 should be retracted in the cylinders 137 such that the rollers 135 escape from the cam 132.

The retraction of the rollers 135 and associated pistons 138, to obtain the release of the engines 130, 140 is operated by applying suitable pressure in the engine casing, that is to say in the chamber ranging between the multi-lobe cam 132 and the external space of the cylinder block 134. The pressure, thus exerted by the fluid is applied on the pistons 138 and retracts the latter in the cylinders 137.

The retraction of the pistons which corresponds to a disengagement operation can also be aided by springs. These are generally placed on the side of the pistons to pull them towards the centre of the cylinder block. The structure, position and functioning of such springs operating a stress in retracted position of the pistons are known per se by the skilled person and hence will not be described hereinafter in further detail. It can be found as a reference and in non limiting manner information in documents FR 2426812, FR 2651836 and FR 2504987.

The retraction of the pistons 138 can be performed by solely a pressure from the casing, or jointly by a pressure from the casing in addition to stress from the springs, for example by applying pressure from the casing when the pistons are entering, while springs are sufficient to keep the pistons retracted.

Particularly, when stopped, there is no pressure in the casings. The pistons 138 are thus maintained in inward position by the aforementioned springs.

As can be seen on FIG. 1, the engines 130 and 140 are connected in parallel. To this end, the hydraulic circuit 100 comprises a high pressure line 150 and a low pressure line 152. An inlet of each engine 130, 140 is connected to the high pressure line 150, preferably by means of a flow divider 154. The structure of such a flow divider 154 is known per se by the skilled person and will not be further described hereinafter.

The outlets of the engines 130, 140 are also connected in parallel to the low pressure line 152.

The circuit 100 comprises, in addition a return line 122 connected to the return line 126 and to the connector 33 intended to engage with the return connector 32.

The circuit 100 comprises a 5 way, 3 position distributor 160, interposed between, on the one hand, the supply line 120 and the return line 122, and on the other hand the high pressure line 150 and the low pressure line 152.

The inlets 161, 162 of the distributor 160 are respectively connected to the supply line 120 and to the return line 122.

A first outlet 163 of the distributor 160 is connected to the inlets of the engines 130, 140, more particularly to the inlet of the divider 154.

A second outlet 164 of the distributor 160 is connected to the outlets of the engines 130, 140.

The third outlet 165 of the distributor 160 is connected to the return line 122 by a duct 166.

Figure 5:
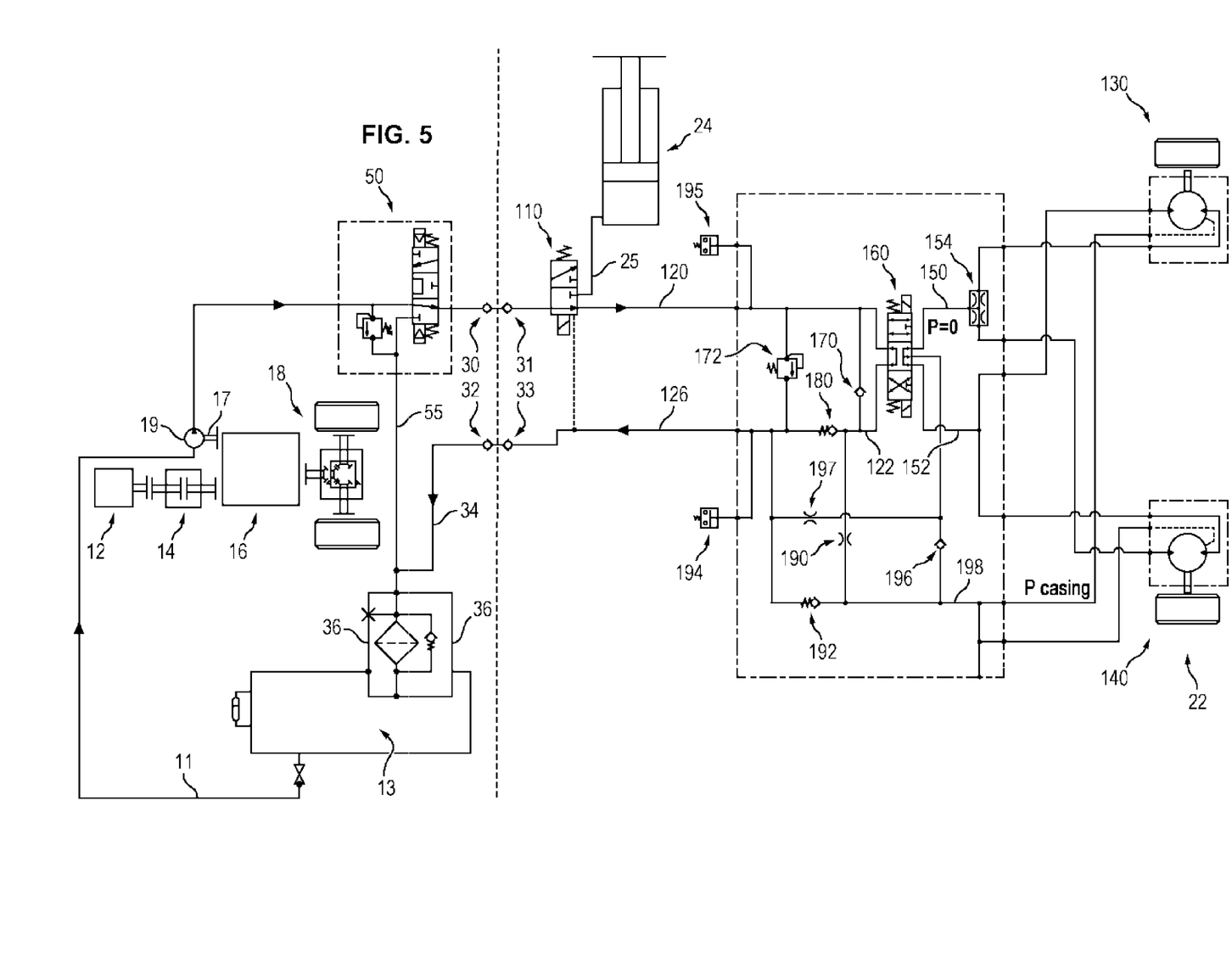
FIG. 5 represents a view of this assembly in assistance selection position, prior to the activation thereof.

In a first inoperative position, the two inlets 161, 162 of the distributor 160 are interconnected as can be seen on FIG. 5 and the three outlets 163, 164, 165 of the same distributor 160 are also interconnected. In this position, the assistance circuit is short circuited. When the assistance is selected but is not activated, and hence, the supply of the jack 24 is not selected, the oil pumped by the pump 19 is returned to the tank 13 by the return lines 122, 126. The supply and return ducts of the engines 130, 140 are not supplied, and are connected to the oil tank with no pressure 13. In fact, the high pressure 150 and the low pressure 152 lines are connected to the tank 13 by means of the outlet 165 and the duct 166 that forms a line for draining the engines.

However, as it will be understood from reading the following description, there prevails in the casing of the engines 130 and 140 a pressure coming from the restriction 190 and limited by the leak valve 192. The pressure thus, prevailing in the casings of the engines 130 and 140 is at 1.5 bar when the leak valve 192 is thus set at 1.5 bar.

This pressure present in casings of engines 130 and 140 is thus higher than the pressure present in the cylinders of the engines (which is practically null) but lower than the pressure applied on the supply duct 120.

Figure 6:
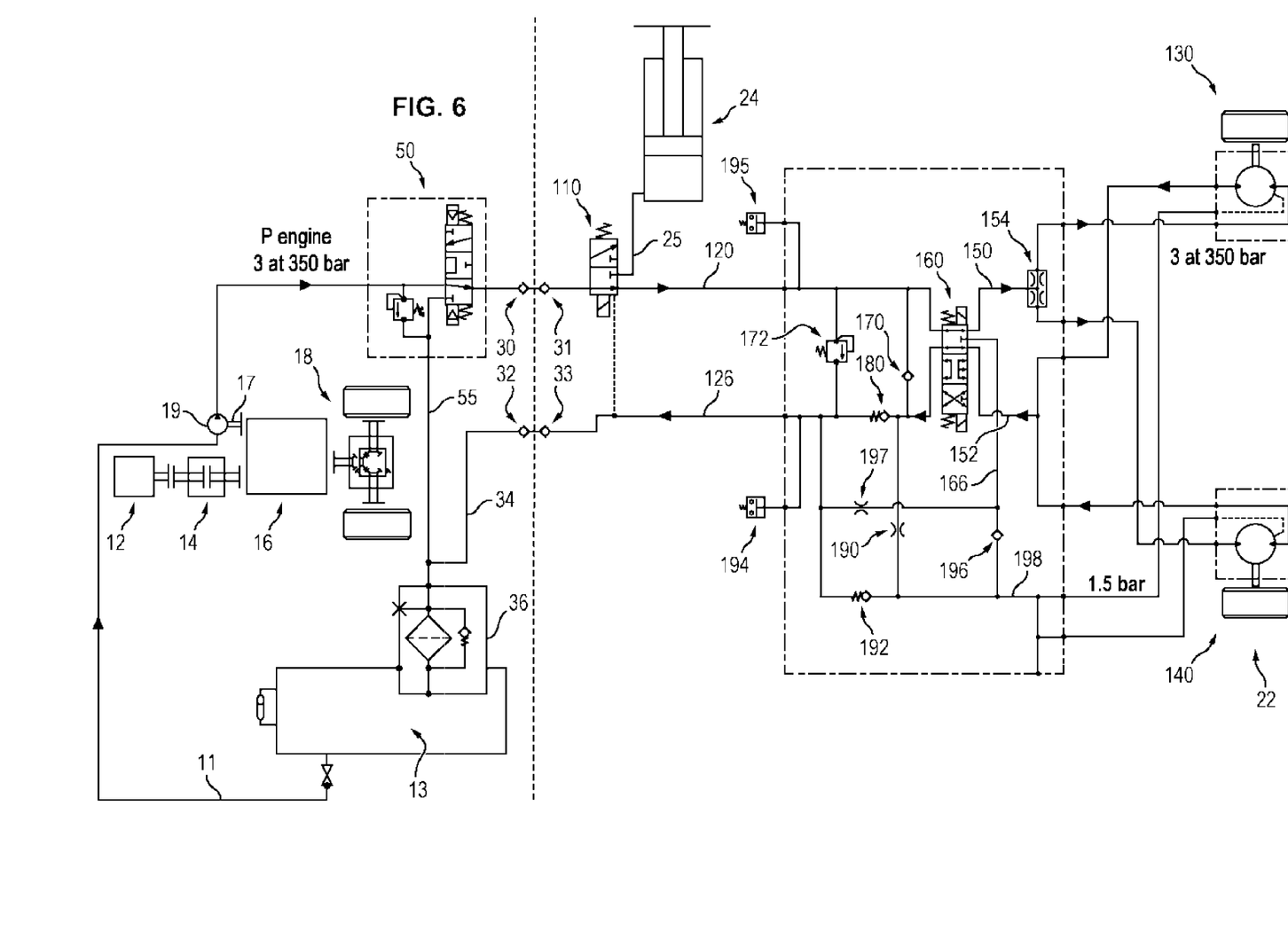
FIG. 6 represents a view of this assembly in assistance selection and activation position.

In a second position of the distributor 160 as illustrated on FIG. 6, the first inlet 161 is connected to the outlet 163 and the second inlet 162 is connected to the second outlet 164. The engines 130, 140 are thus supplied by the pump 19 by means of the ducts 120, 122 in the forward direction corresponding to a first direction of rotation of the engine.

Figure 8:
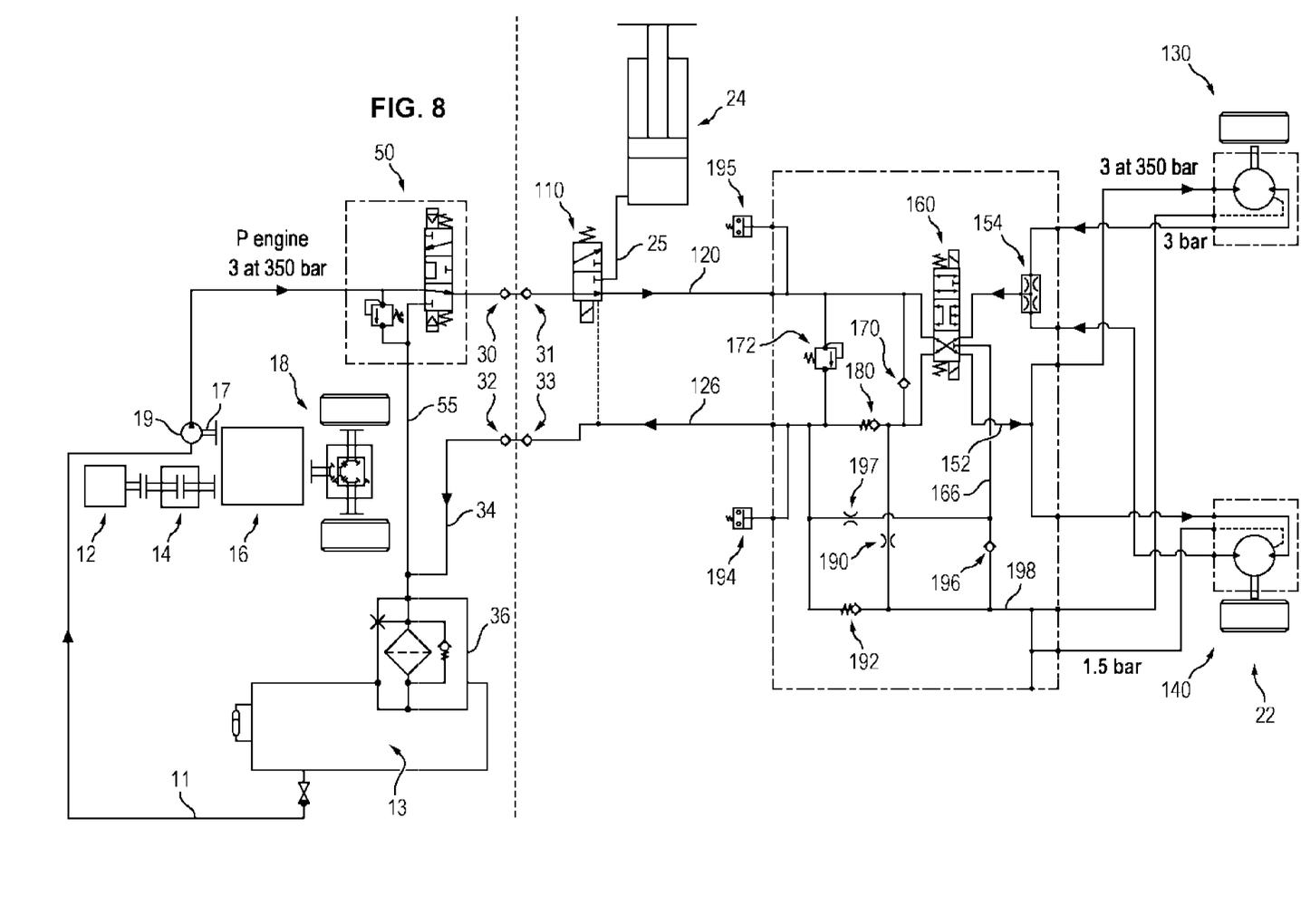
FIG. 8 represents a view of this assembly in assistance selection and activation position in reverse gear.

On the contrary, in the third position of the distributor 160 as illustrated on FIG. 8, the first inlet 161 is connected to the second outlet 164 and the second inlet 162 is connected to the first outlet 163. The engines 130, 140 are then driven in the opposite direction of rotation, in reverse.

Figure 2:
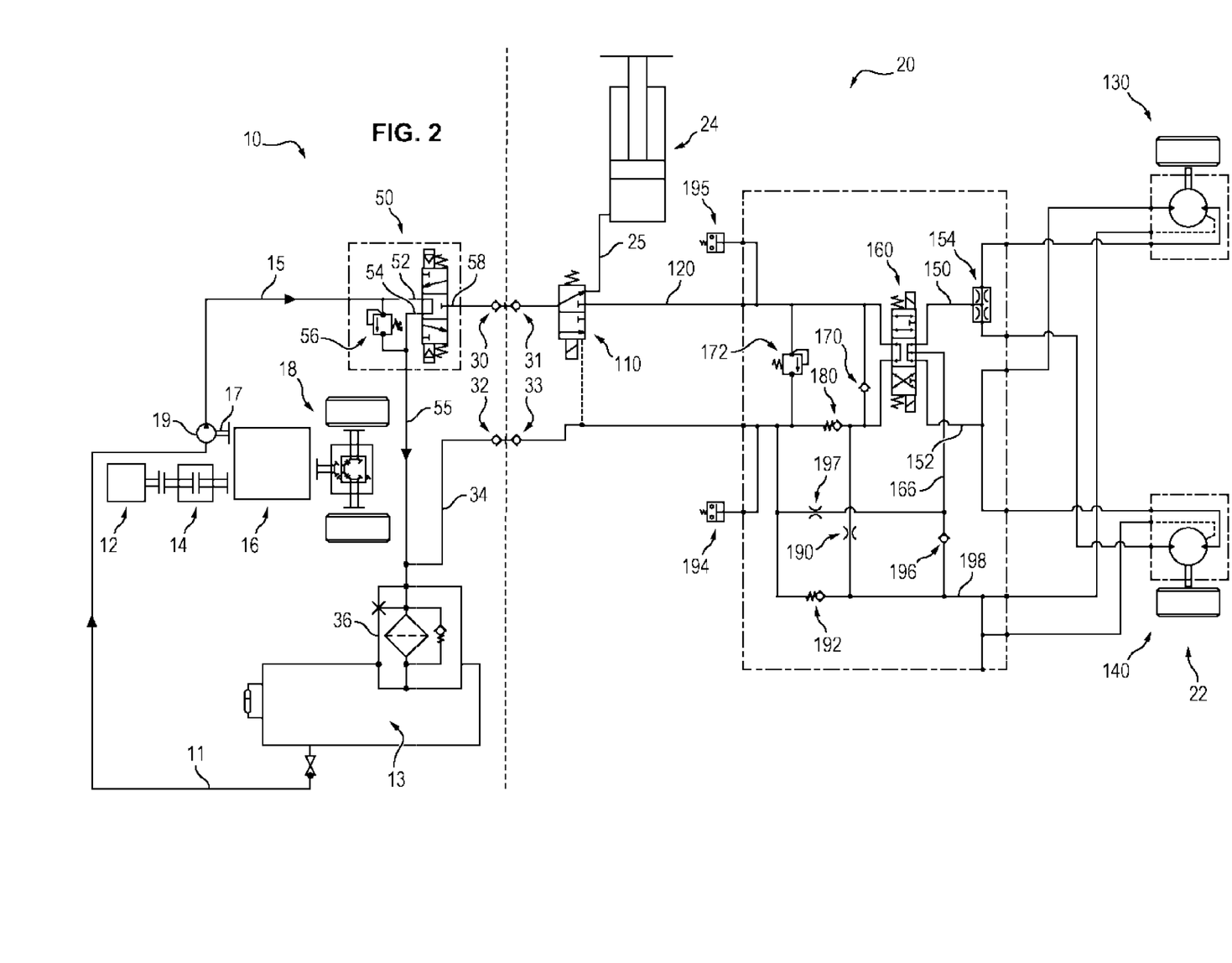
FIG. 2 represents a view of this assembly in accordance with the present invention, in a stop position.

The circuit 100 represented on FIGS. 1 and 2 also comprises a check valve 170 placed between the supply line 120 and the return line 122. The valve 170 is blocking in the direction extending from the supply line 120 to the return line 122. On the contrary, it is conducting in the direction extending from the return line 122 to the supply line 120. The valve 170 is preferably set at 0 bar.

The valve 170 is a recirculation valve effective whenever the speed of the vehicle exceeds the maximum acceptable speed by the hydraulic transmission system for example when the speed corresponds to an output higher than the output of the pump.

A pressure limiter 172 is placed between the supply line 120 and the return line 122. By way of a non limiting example, the pressure limiter 172 can be set at 350 bars. It allows limiting the pressure on the high pressure line 150 by evacuating any additional pressure to the tank 13.

According to the invention, it is further provided between the connecting point of the pressure limiter 172 on the return line 122 and the distributor 160, a member 180 forming a restriction. This member forming a restriction 180 is associated to adapted retapping means for connecting the part of the return duct 122 located upstream of the member forming a restriction 180 and applying to the casing of the engines 130, 140, from this return duct 122, a pressure lower than the pressure of this return duct 122.

The member 180 can for example be set at 3 bars.

Preferably, as illustrated on the accompanying figures, the aforementioned retapping means comprise an output tapping device on the return duct 122 which includes a secondary limitation restriction 190 and a leak valve 192.

The restriction 180 is formed for example of a valve set at 6 bars extending in the direction of the tank 13.

Alternatively, the restriction 180 can be formed by a jet, a simple restriction, a pressure limiter or any other equivalent means defining a head loss.

The circuit can be controlled by a temperature sensor 194 measuring the temperature on the return line 122 downstream of the restriction 180 and a pressure sensor 195 measuring the pressure of the oil in the circuit, for example at the supply duct 120.

The information gathered from the temperature sensor 194 allows the system computer to force the disengaging of the assistance whenever the temperature is higher than a set threshold.

The pressure sensor 195 allows detecting and forcing the disengaging of the assistance system if the output required by the speed of rotation of the wheels is higher than that provided by the pump 19. This status is detected by the sensor 195 considering that an output required by a speed of rotation of the wheels higher than that which the pump 19 can provide leads to a pressure drop in the supply branch.

The secondary restriction 190 connects the section of the return duct 122 located upstream of the main restriction 180, at the inlet 198 of the engine 130, 140 casings.

The leak valve 192 is placed between the side of the secondary restriction 190 opposite to the return duct 122 and the return duct 126 which opens onto the connector 33. It extends in the direction of the connector 33.

Such a restriction 190 can be formed either by the connecting line which leads from the return duct 122 to the inlet of the leak valve 192 if this connecting line corresponds to a sufficient head loss, or by a restriction added onto this connecting line. In this last case, the restriction 190 can be formed for example and in a non limiting manner by a jet or a local reduction in diameter of the connecting line.

Figure 7:
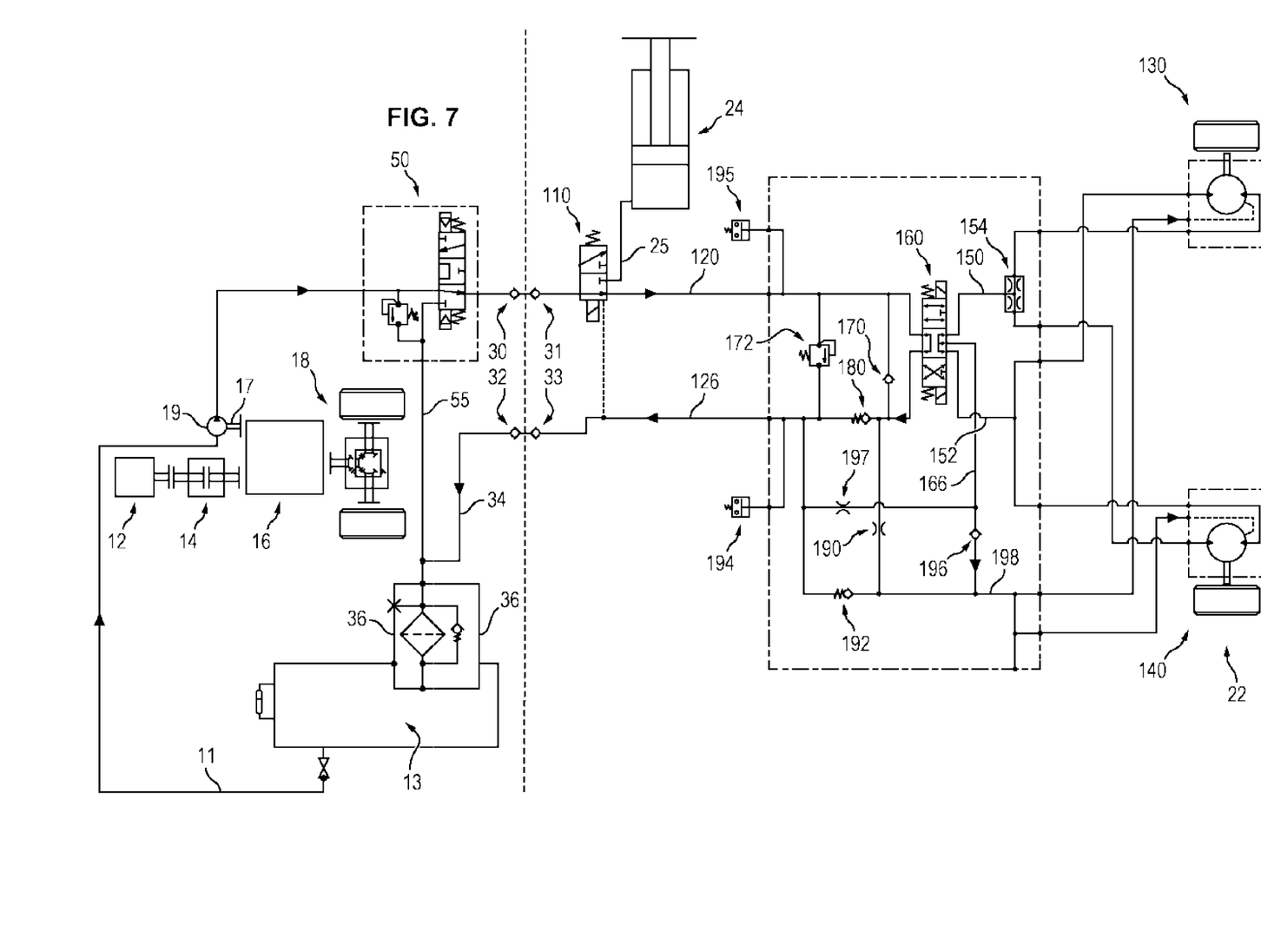
FIG. 7 represents the status of the assembly during the assistance deactivation phase.

The restriction 180 allows creating a pressure for controlling engine casings without requiring the use of a booster pump, or an auxiliary pump, in the configuration represented on FIG. 7. This casing pressure allows placing the pistons 138 in retracted position in the cylinders 137. This enables the rotor 136 of the engines 130, 140 to turn with respect to the stator without generating torque output, corresponding to an "overrunning clutch" position. Depending on whether the pistons are retracted or in contact with the cam, the engine is said to be disengaged or engaged, or released and clawed, the pistons performing with the cam a claw function.

The leak valve 192 can be for example set at 1.5 bar for applying such a pressure on the casing of engines 130, 140 for a pressure on the supply duct 120 of the order of 3 to 6 bars and a pressure on the return duct of the engines of the order of 6 bars.

The leak valve allows maintaining the engine 130, 140 casings under permanent pressure.

The control of the pressure in the engine casings can allow a progressive control of the evolution of the pressure applied to the pistons and can consequently allow preventing any rattling of the pistons and rollers 135 on the multi-lobe cam 132 during clutch release.

The skilled person will hence understand that the restriction 180 compliant with the invention allows creating adequate pressure directed to the engine casings, which is particularly effective during the engagement or disengagement of the engines.

The pressure permanently applied on the engine casings, lower than the minimum return pressure of the engines does not hinder the pistons position well pressed against the cam when the engine is in assistance, while maintaining on the contrary the pistons inside when the pressure on the engine supply and return lines drops.

The invention has previously been described with reference to its application to a trailer 20 intended to be towed by a towing vehicle 10 and including a driving assistance circuit. The towing vehicle is for example an articulated towing truck or semi-trailer.

The invention is however not limited to its application to a trailer. The invention can apply to the driving assistance of any vehicle without a trailer, for example for driving a non motorized axle of a vehicle. In a preferred embodiment, the circuit of the invention applies particularly well to engines with radial pistons and multi-lobe cams that are disengage by retraction of the pistons in the block, and turning at the speed of the shaft they drive, and particularly turning at the speed of the wheels, or at the speed of an axle inlet shaft.

As can be seen on the accompanying drawings, the hydraulic circuit preferably further comprises a recirculation valve 196 which connects the outlet 165 of the distributor 160 and the line connected to the casing of the engines 130, 140.

The recirculation valve 196 extends in the direction from the outlet 165 of the distributor 160 towards the line connected to the engine 130, 140 casing. This valve is a standard check valve, however, for the purpose of stability and sealing in operation, one can choose a valve fitted with a spring that is hardly weighted. In a preferred manner, it is set at a value lower than the pressure that is present in the supply and return ducts of the engines 130 and 140 when the pistons are inside, when the distributor 160 is in central short-circuit position of the engines, for example set at 0.3 bar. Ideally, the weighting of the recirculation valve 196 is as low as possible so as not to perturb the effect of configured springs in order to ensure piston disengagement.

Thus, the recirculation valve 196 connects the supply 150 and return 152 lines of the engines 130, 140, to the engine casing, in non supplied position of the engines.

The recirculation valve 196 allows directing towards the engine 130, 140 casing the oil which is discharged by the displacement of the pistons 138 by the cam 132. Thereby, this prevents that when the pistons 138 enter the cylinder block slowly during engine deactivation, due to the output coming from the pump not being sufficient to fill the engine 130, 140 casings fast enough, the partially entered pistons 138 do not hit on the cam 132.

Thanks to the recirculation valve 196, if the cam 132 dispels the pistons 138, the excess of local pressure in the engines supply and return lines is discharged towards the engine casing, by means of the valve 196, since that, in this status, the distributor 160 outlets 163, 164 and 165 are interconnected. The engine 130, 140 casing thus instantaneously fills when the pistons 138 enter into the cylinder block. The oil is discharged from one side of a piston 138 ending up in the casing on the other side. The system operates at equivolume of displaced oil.

Thus, thanks to the recirculation valve 196 all pistons 138 enter by the cam 132 and cannot exit at a fraction of a turn. The casing is filled instantaneously without having to wait for the oil to come from the pump 19.

The pump 19 substantially serves to maintain the required casing pressure in the engines to keep the pistons 138 in retracted position.

It can also be seen, on the accompanying drawings, a restriction 197 on the line section which connects the third outlet 165 of the distributor 160 to the return line 126, and downstream of the recirculation valve 196.

The restriction 197 is thus placed on a section of line located between the inlet of the recirculation valve 196 and the return line 126.

The function of this restriction 197 is to create a head loss which allows a temporary pressure increase on the inlet of the recirculation valve 196, when the engines are short-circuited by the distributor 160 and thereby let the oil discharged from the engines 130, 140 pass via the recirculation valve 196.

Such a restriction 197 can either be formed by the connecting line which leads from the outlet 165 of the distributor 160 to the return line 126 if this connecting line corresponds to a sufficient head loss, or by a restriction added onto this connecting line. In this last case, the restriction 197 can be formed for example and in a non limiting manner by a jet or a local reduction in diameter of the connecting line, that is to say a throat.

It is observed that the volume of oil discharged to bring in the pistons 138 is equal to the volume injected in the engine 130, 140 casing, the restriction or head loss 197 does not hinder the piston 138 retraction in any way as there is hardly any oil output in this line during the piston retraction phase.

The skilled person will understand that the present invention offers many advantages with respect to the state of the art.

The driving assistance hydraulic circuit in accordance to the invention is simple and cheap. It allows for reusing the circuit known of existent vehicles fitted with means for ensuring dumping, available on a tractor.

The circuit of the invention also allows for an overrunning clutch position. The system in accordance with the invention only requires two connecting lines. The system in compliance with the invention allows to have a driving assistance by simple addition onto a known existent system on a tractor vehicle without having any effect on the pre-existent equipment, particularly intended for dumping, the latter remaining functional.

The invention allows for full safety control.

Furthermore, the present invention does not require a booster pump or a backup and allows by recreating a pressure applied to the engine casing, a silent engaging when the rollers 135 are displaced in abutment against the multi-lobe cam 132, while allowing for a fast disengaging thanks to the casing pressure.

The assistance system described in the present application and based on engines 130, 140 can be placed on other wheels than those of a trailer. It can, by using the pump 19 of open loop hydraulic accessories, be associated for example to truck bearing axles, in particular a front steering axle, multiple steering axles, adjustable axles, etc.

The invention claimed is:

1. A driving assistance system for a vehicle, the system comprising:
   a tank;
   a hydraulic pump;
   a disengageable hydraulic engine having an engine casing;
   an open hydraulic circuit extending through the tank and comprising:
      a suction duct extending from the tank to an inlet of the hydraulic pump;
      a supply duct extending from an outlet of the hydraulic pump to an inlet of the hydraulic engine; and
      a return duct starting at an outlet of the hydraulic engine and ending at the tank, all the return duct extending outside the hydraulic engine;
   a restriction member located on the return duct and configured for forming a restriction and for creating a head loss or loss of charge on the return duct; and
   connecting means configured for connecting to the engine casing a part of the return duct located upstream of the restriction member and applying to the engine casing from the return duct a pressure lower than a pressure of the return duct.

2. The system according to claim 1, wherein the restriction member comprises a check valve extending in a direction of the tank.

3. The system according to claim 2, wherein the check valve is set at 6 bar.

4. The system according to claim 1, wherein the restriction member comprises a jet, a restriction or a pressure limiter.

5. The system according to claim 1, wherein the connecting means comprises an output tapping device, the output tapping device including a secondary limitation restriction.

6. The system according to claim 5, wherein the secondary limitation restriction is placed between the return duct and the engine casing and wherein a leak valve is placed between an outlet of the secondary limitation restriction and the return duct or the tank.

7. The system according to claim 1, wherein the hydraulic engine comprises pistons and cylinders, the cylinders configured to receive the pistons, and wherein the system is configured such that a pressure of a fluid applied on the engine casing ensures that the pistons are maintained in a retracted position in the respective cylinders.

8. The system according to claim 1, further comprising a supply line, a return line, and a pressure limiter placed between the supply line and the return line.

9. The system according to claim 1, further comprising
a supply line,
a return line, and
a check valve connected between the supply line and the return line and configured for allowing fluid to pass in a direction from the supply line to the return line.

10. The system according to claim 9, wherein the check valve is set at 0 bar.

11. The system according to claim 1, wherein the hydraulic engine has radial pistons and a multi-lobe cam, the hydraulic engine being configured to be disengaged by disengaging the radial pistons and the multi-lobe cam.

12. The system according to claim 1, further comprising a three position distributor configured to ensure a supply of the hydraulic engine in a first direction and a supply of the hydraulic engine in an opposite direction and to define a non-supplied position of the hydraulic engine corresponding to an overrunning clutch position.

13. The system according to claim 1, further comprising a recirculation valve which connects a supply line and a return line of the hydraulic engine to the engine casing when the system has a configuration in which the hydraulic engine is not supplied with fluid.

14. The system according to claim 13, further comprising a restriction element on a section of line located between an inlet of the recirculation valve and a return line of the recirculation valve.

15. A vehicle equipped with the driving assistance system according to claim 1.

16. A method for managing a driving assistance system comprising:
connecting a casing of a hydraulic engine upstream of a restriction member to a return duct starting at an outlet of the hydraulic engine and ending at a tank, all the return duct extending outside the hydraulic engine, the restriction member being located on the return duct; and
creating a head loss by means of the restriction member applying to the engine casing from the return duct, a pressure lower than a pressure of the return duct.

17. The method according to claim 16, wherein connecting the casing of the hydraulic engine to the return duct upstream of the restriction member is operated by means of an output tapping device which includes a secondary limitation restriction.

18. The vehicle of claim 15, wherein the vehicle is a towing vehicle having the hydraulic pump.

* * * * *